US011758225B1

(12) United States Patent
Victor et al.

(10) Patent No.: US 11,758,225 B1
(45) Date of Patent: Sep. 12, 2023

(54) ENHANCED CROSS-MEDIA CHANNEL DETERMINISTIC AND MODELED PRESENTATION FREQUENCY LIMITS

(71) Applicant: Amazon Technologies, Inc., Seattle, WA (US)

(72) Inventors: Robert James Victor, Brookville, PA (US); Amit Gupta, Bothell, WA (US); Kirtan Modi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,300

(22) Filed: Jun. 29, 2022

(51) Int. Cl.
    *H04N 21/454*     (2011.01)
    *H04N 21/439*     (2011.01)
    *H04N 21/442*     (2011.01)

(52) U.S. Cl.
    CPC ....... *H04N 21/454* (2013.01); *H04N 21/4394* (2013.01); *H04N 21/44204* (2013.01)

(58) Field of Classification Search
    CPC ............. H04N 21/454; H04N 21/4394; H04N 21/44204; G06Q 30/00
    See application file for complete search history.

(56) References Cited

U.S. PATENT DOCUMENTS

| | | | | |
|---|---|---|---|---|
| 10,701,409 | B1* | 6/2020 | Gupta | H04N 21/23424 |
| 2020/0169773 | A1* | 5/2020 | Major | H04N 21/26241 |
| 2022/0174337 | A1* | 1/2022 | Jentz | H04N 21/23424 |

OTHER PUBLICATIONS

U.S. Appl. No. 17/584,009, filed Jan. 25, 2022, titled Enhanced On-Target Rate Optimization for Video Using Machine Learning.
U.S. Appl. No. 17/457,023, filed Nov. 30, 2021, titled Enhanced Recognition of Content Audiences.
U.S. Appl. No. 17/457,023, filed Nov. 30, 2021, titled Enhanced Management of Content Presentation Frequency Using Content Consumption Patterns.

\* cited by examiner

*Primary Examiner* — Anthony Bantamoi
(74) *Attorney, Agent, or Firm* — Eversheds Sutherland (US) LLP (57) ABSTRACT

Devices, systems, and methods are provided for managing advertisement exposure. The method may include receiving, by a first device, from a second device, an audio fingerprint based on presentation of first media content using a first media channel at a first time; determining, using automatic content recognition, that the audio fingerprint represents a portion of a first advertisement; determining that the first advertisement was presented at a second time using a second media channel and the second device; determining that a first number of times that the first advertisement has been presented to the user exceeds a first threshold number and that a second number of times that the first advertisement has been presented to the user does not exceed a second threshold number; refraining from selecting the first advertisement at a third time; and selecting the first advertisement for presentation at a fourth time.

20 Claims, 6 Drawing Sheets

ENHANCED CROSS-MEDIA CHANNEL DETERMINISTIC AND MODELED PRESENTATION FREQUENCY LIMITS

BACKGROUND

People increasingly are consuming media on multiple platforms, such as cable television and streaming media. Even within streaming media, people may consume content provided by multiple applications. Because each medium, application, and platform may not be able to determine what content a person has consumed and which advertisements were presented to a person, people often are presented the same advertisements for the same products as they consume media across the different platforms. In addition, even when an application is aware that a person has recently been served an advertisement, the application still may present the same or similar advertisement to a person to meet contractual obligations. The repeated presentation of the same advertisements to a person can undermine user experience.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for cross-media channel deterministic and modeled presentation frequency limits.

Advertisement repetition is a significant complaint from viewers of streaming and cable content. Viewers may be served the same or similar advertisements (e.g., different variations of the same advertisement and/or advertisements for a same product or brand) while consuming content in a same application and when consuming content in multiple applications. For example, a viewer may be presented with the same advertisement back-to-back during an advertisement break, during consecutive advertisement breaks, during presentation of a same media title (e.g., the same advertisement multiple times during a program), and within a short time period (e.g., a same day or less) when consuming content on different platforms. In a particular example, a viewer may be presented an advertisement while watching content on one streaming media application, then may be presented the same or similar advertisement while watching content on another streaming media application, while watching content using cable television, and/or while watching content using over-the-air (OTA) broadcasting.

Advertisement services may use frequency caps to avoid over-serving advertisements. However, advertisement services also have contractual obligations to serve an advertisement an agreed number of times, so an advertisement may be over-served to a viewer to meet such obligations. Therefore, services lack incentive to limit the delivery frequency of advertisements, as such limits may reduce revenue.

Privacy and other concerns limit the data that different media platforms share with one another. Some services may use Automatic Content Recognition (ACR) to identify which content is presented to a viewer. ACR allows a device to listen and/or see what content is being presented by using pattern matching of captured audio and/or video signals. The captured audio and/or video signals may be compared to a library of audio and/or video signals to detect a match. However, some services use ACR to identify viewers who have never or rarely seen an advertisement so that those viewers may be presented the advertisement (e.g., negative advertisement targeting). Such use of ACR represents an attempt to identify more opportunities to present an advertisement rather than an attempt to determine an optimal frequency that limits a viewer's exposure to an advertisement to improve a viewer's experience.

There is therefore a need to implement advertisement frequency limits across multiple media channels.

In one or more embodiments, a streaming media operating system running on a client device may implement ACR (e.g., with user consent and in accordance with relevant laws) to detect which advertisements are presented to users. Based on the advertisement exposure, an advertisement service may implement frequency caps to limit the exposure of an advertisement to a viewer across multiple media channels. The frequency caps may be set to optimize the frequency of advertisement exposure to a user so that the user is not over-exposed to an advertisement. For example, because of ACR, the exposure frequency may account for exposure on cable television and streaming media, including on-demand and linear content presentations.

In one or more embodiments, the exposure frequency may be used to limit advertisement exposure on first-party applications and third-party applications (e.g., by reporting advertisement exposure to third-party applications or overwriting third-party application advertisements, in accordance with relevant laws). In one example, the streaming media operating system may use ACR to determine which advertisements have been presented to a user while viewing linear cable television, and an advertisement service may consider the presentation of the advertisements with linear cable television when making advertisement serving decisions during presentation of streaming media content (e.g., using a streaming media application available using the streaming media operating system). In particular, the advertisement service may prevent an advertisement from being presented during presentation of streaming media content when that advertisement was recently presented (e.g., with a same day) using linear cable television and/or using a different streaming media application. In this manner, the advertisement service may determine an optimal number of times to reach viewers with advertisements across multiple media channels.

In one or more embodiments, for users who opt out of ACR or for when ACR is otherwise unavailable, the advertisement service may use audience modeling to estimate advertisement exposure across multiple content mediums. For example, U.S. patent application Ser. No. 17/584,009, filed Jan. 25, 2022, U.S. patent application Ser. No. 17/457,024, filed Nov. 30, 2021, and U.S. patent application Ser. No. 17/457,023, filed Nov. 30, 2021, describe audience modeling, and are hereby incorporated by reference. By estimating which content a viewer was presented, the advertisement service may determine or estimate which advertisements were presented, and may account for the estimated advertisement exposure when serving advertisements. In this manner, estimated advertisement exposure using a combination of ACR and non-ACR techniques such as audience modeling may affect advertisement selection and presentation.

In one or more embodiments, ACR may capture audio from a device based on the audio playback data (e.g., in contrast with a recording of audio captured by a microphone). In particular, as the audio data is decoded for playback at a device (e.g., a television, stereo system, etc.), the streaming media operating system may generate snippets as fingerprints (e.g., fingerprints may be generated and hashed locally at the client-device level). The streaming media operating system may send the audio fingerprints to a remote device (e.g., a cloud-based device) for analysis. The remote device may compare the audio fingerprints to a database of audio fingerprints to detect a match. Because the media title or advertisement from which the audio fingerprints in the database are known to the remote device, the remote device may determine from which media title or advertisement a fingerprint generated by the streaming media application originated. The remote device may determine that an advertisement was presented to the user at a particular time, and can include that exposure to a count against a frequency cap.

In one or more embodiments, third-party applications may provide to the remote device similar ACR and/or audience modeling data indicating which advertisements were presented on other applications (e.g., to which the streaming media application may not have access). The third-party data may be considered when determining advertisement exposure across multiple channels.

In one or more embodiments, the advertisement service may use frequency caps in combination with the advertisement exposure data across multiple channels to avoid presenting the same or similar advertisement to a user within a given time period, such as in consecutive advertisements, in a same advertisement break, and/or in multiple advertisement breaks during a time period or media title. In particular, the advertisement service may avoid selecting an advertisement that may have already been presented to a user during a particular time period or media title, either by not selecting the advertisement, removing the advertisement from an advertisement pod, and/or communicating the exposure of an advertisement to a third-party service.

In one or more embodiments, to determine whether an advertisement may be presented to a user without overexposing the user to the advertisement, frequency thresholds may be used to limit exposure. For example, the advertisement service may use one or more thresholds for advertisement frequency within a same advertisement pod, adjacent (e.g., consecutive) advertisement pods, a user session, and/or a time period (e.g., a day, a few hours, etc.). When an advertisement, a similar advertisement for a same product or brand, or a shorter or longer version of same advertisement has been presented to a user a threshold number of times (e.g., based on the one or more thresholds described above), the advertisement service may refrain from serving that advertisement to the user. Similar to the different thresholds, the advertisement service may prioritize the mitigation of advertisement over-exposure based on a perceived severity of the impact of different types of over-exposure (e.g., same advertisement within a pod, same advertisement within adjacent pods, same advertisement within a user session, same advertisement within a time period). An example of the perceived severity of advertisement over-exposure types is shown below in Table 1:

TABLE 1

Perceived severity of advertisement over-exposure types:

| | Creative | Campaign | Brand | Sub-Brand |
| --- | --- | --- | --- | --- |
| Current pod | High | High | High | High |
| Adjacent pod | High | High | Medium | Medium |
| Same Session | High | Medium | Medium | Low |
| Same Day | Medium | Medium | Low | Low |

As shown in Table 1, showing a same advertisement (e.g., creative), a same advertisement campaign, advertisements for a same brand, and advertisements for a same sub-brand within a current (e.g., same) advertisement pod may be considered as having high perceived impact on a user's experience. In adjacent advertisement pods, showing a same advertisement or a same advertisement campaign may be considered as having high perceived impact on a user's experience, but advertisements for a same brand or sub-brand within adjacent pods may be of medium impact. In this manner, the frequency thresholds (caps) for higher impact over-exposure events may be lower than the frequency thresholds for lower impact over-exposure events. The advertisement service may set the thresholds based on the perceived impact as shown in Table 1. In this manner, the frequency thresholds may be optimized to improve a user's experience.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
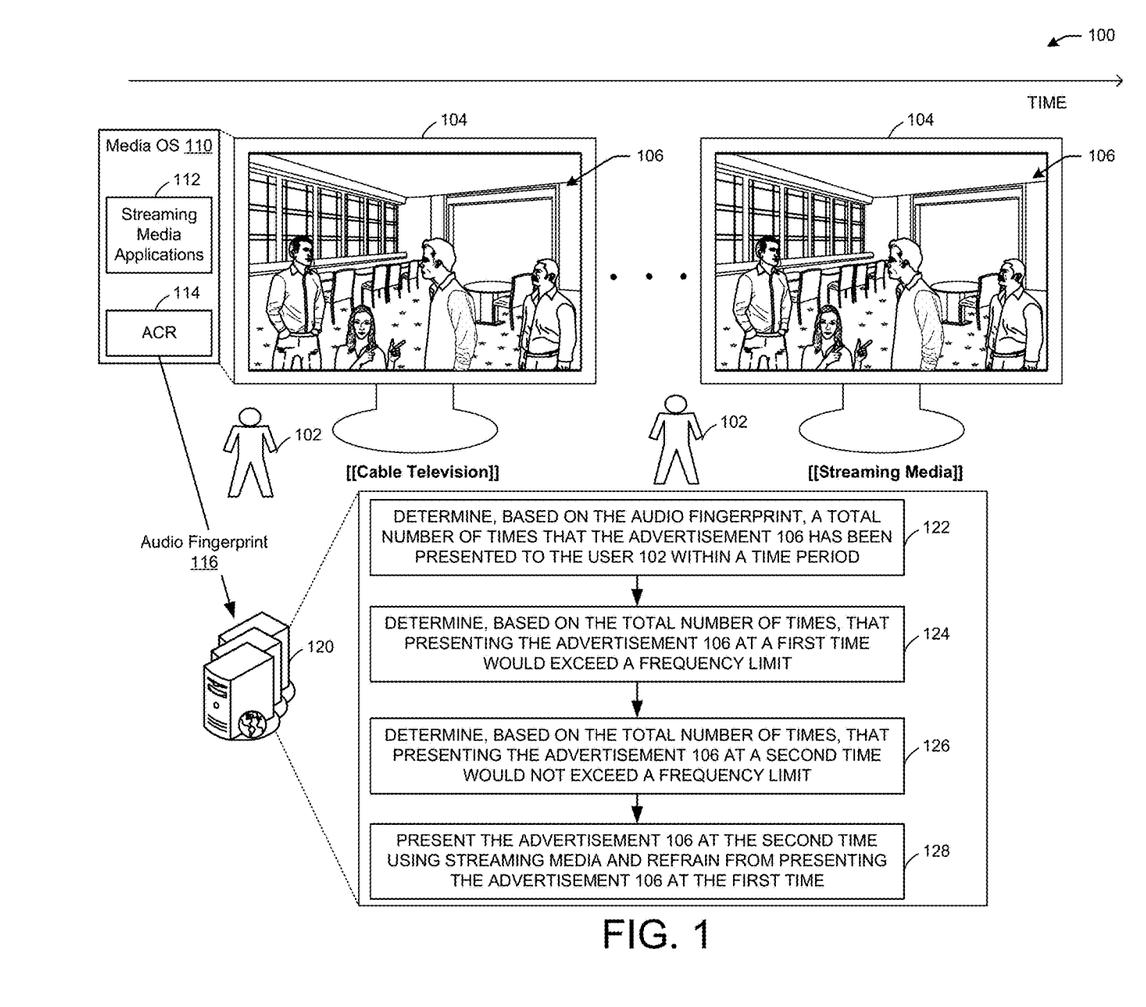
FIG. 1 shows an example process for cross-media advertisement presentation frequency limits, in accordance with one or more example embodiments of the present disclosure.

FIG. 1 shows an example process 100 for cross-media advertisement presentation frequency limits, in accordance with one or more example embodiments of the present disclosure.

Referring to FIG. 1, the process 100 may include a user 102 viewing, with a device 104, a video advertisement 106 (e.g., frames of video). The video advertisement 106 may use a first media channel (e.g., cable television or streaming video application). The device 104 may have or be in communication with a media operating system (OS) 110, which may have streaming media applications 112 that the user 102 may select for viewing content via the device 104. The media OS 110 also may include ACR modules 114, which may sample video and/or audio data presented via the device 104. For example, the ACR modules 114 may sample audio data corresponding to the video advertisement 106, and may generate an audio fingerprint 116 that may be hashed and sent to a remote system 120 (e.g., a cloud-based system). The audio fingerprint 116 may include a portion of audio data presented with the video advertisement 106 by the device 104, allowing the remote system 120 to perform ACR to identify audio content that matches the audio fingerprint 116, and to identify the video advertisement 106 that corresponds to the audio content.

Still referring to FIG. 1, at a later time, the user 102 may be watching the device 104 and may be presented the same video advertisement 106 when using a second media channel different than the first media channel. For example, the first media channel may be cable television, and the second media channel may be one of the streaming media applications 112. In this manner, the remote system 120 may be able to identify the video advertisement 106 when presented using a first-party streaming media application, and may rely on ACR to identify the video advertisement 106 when presented with cable television or a third-party streaming media application.

Still referring to FIG. 1, the remote system 120 may account for the cross-channel presentation of the video advertisement 106 so that the user 102 is not presented with the video advertisement 106 too often. For example, the remote system 120 may be aware of which advertisements were presented using a first-party streaming media application, and ACR may allow the remote system 120 to determine which advertisements are presented using third-party applications and cable television. At step 122, the remote system 120 may determine a total number of times that the video advertisement 106 has been presented to the user 102 based on the presentation using cable television and based on the presentation using the streaming media application. At step 124, the remote system 120 may determine, based on the number of times that the video advertisement 106 has been presented within a time period, that presenting the video advertisement 106 at a first time would exceed a frequency limit. At step 126, the remote system 120 may determine that presenting the video advertisement 106 at a second time would not exceed a frequency limit. For example, a frequency limit may be associated with limiting presentation of an advertisement multiple times within a same advertisement pod, in consecutive advertisement pods, during a same user session, and during a same day. The video advertisement 106 may exceed a frequency limit restricting presentation of an advertisement multiple times within a same advertisement pod or within consecutive advertisement pods, for example, but may not exceed a frequency limit for presenting the advertisement within a same user session or the same day. At step 128, when presentation of the video advertisement 106 at one time would exceed a frequency limit, the remote system 120 may refrain from selecting the video advertisement 106 for presentation at that time to the user 102. When presentation of the video advertisement 106 at one time would not exceed a frequency limit, the remote system 120 may select the video advertisement 106 for presentation at that time to the user 102. In this manner, the remote system 120 may ensure that the video advertisement 106 is not presented too often to the user 102.

In one or more embodiments, the frequency caps (limits) may be set to optimize the frequency of advertisement exposure to a user so that the user is not over-exposed to an advertisement. For example, because of ACR, the exposure frequency may account for exposure on cable television and streaming media, including on-demand and linear content presentations.

In one or more embodiments, the exposure frequency may be used to limit advertisement exposure on first-party applications and third-party applications. In one example, the streaming media operating system may use ACR to determine which advertisements have been presented to a user while viewing linear cable television, and the remote system 120 may consider the presentation of the advertisements with linear cable television when making advertisement serving decisions during presentation of streaming media content (e.g., using a streaming media application available using the streaming media OS 110). In particular, the remote system 120 may prevent an advertisement from being presented during presentation of streaming media content when that advertisement was recently presented (e.g., with a same day) using linear cable television and/or using a different streaming media application. In this manner, the remote system 120 may determine an optimal number of times to reach viewers with advertisements across multiple media channels.

In one or more embodiments, for users who opt out of ACR or for when ACR is otherwise unavailable, the remote system 120 may use audience modeling to estimate advertisement exposure across multiple content mediums. By estimating which content a viewer was presented, the remote system 120 may determine or estimate which advertisements were presented, and may account for the estimated advertisement exposure when serving advertisements. In this manner, estimated advertisement exposure using a combination of ACR and non-ACR techniques such as audience modeling may affect advertisement selection and presentation.

In one or more embodiments, ACR may capture audio from the device 104 based on the audio playback data (e.g., in contrast with a recording of audio captured by a microphone). In particular, as the audio data is decoded for playback at the device 104, the streaming media OS 110 may generate snippets as fingerprints (e.g., fingerprints may be generated and hashed locally at the client-device level). The streaming media OS 110 may send the audio fingerprints to the remote system 120 for analysis. The remote system 120 may compare the audio fingerprints to a database of audio fingerprints to detect a match. Because the media title or advertisement from which the audio fingerprints in the database are known to the remote system 120, the remote system 120 may determine from which media title or advertisement a fingerprint generated by the streaming media application originated. The remote system 120 may determine that an advertisement was presented to the user at a particular time, and can include that exposure to a count against a frequency cap.

In one or more embodiments, third-party applications may provide to the remote system 120 similar ACR and/or audience modeling data indicating which advertisements were presented on other applications (e.g., to which the streaming media application may not have access). The third-party data may be considered when determining advertisement exposure across multiple channels.

In one or more embodiments, the remote system 120 may use frequency caps in combination with the advertisement exposure data across multiple channels to avoid presenting the same or similar advertisement to a user within a given time period, such as in consecutive advertisements, in a same advertisement break, and/or in multiple advertisement breaks during a time period or media title. In particular, the remote system 120 may avoid selecting an advertisement that may have already been presented to a user during a particular time period or media title, either by not selecting the advertisement, removing the advertisement from an advertisement pod, and/or communicating the exposure of an advertisement to a third-party service.

In one or more embodiments, to determine whether an advertisement may be presented to a user without overexposing the user to the advertisement, frequency thresholds may be used to limit exposure. For example, the remote system 120 may use one or more thresholds for advertisement frequency within a same advertisement pod, adjacent (e.g., consecutive) advertisement pods, a user session, and/or a time period (e.g., a day, a few hours, etc.). When an advertisement, a similar advertisement for a same product or brand, or a shorter or longer version of same advertisement has been presented to a user a threshold number of times (e.g., based on the one or more thresholds described above), the remote system 120 may refrain from serving that advertisement to the user. Similar to the different thresholds, the remote system 120 may prioritize the mitigation of advertisement over-exposure based on a perceived severity of the impact of different types of over-exposure (e.g., same advertisement within a pod, same advertisement within adjacent pods, same advertisement within a user session, same advertisement within a time period). An example of the perceived severity of advertisement over-exposure types is shown above in Table 1. As shown in Table 1, showing a same advertisement (e.g., creative), a same advertisement campaign, advertisements for a same brand, and advertisements for a same sub-brand within a current (e.g., same) advertisement pod may be considered as having high perceived impact on a user's experience. In adjacent advertisement pods, showing a same advertisement or a same advertisement campaign may be considered as having high perceived impact on a user's experience, but advertisements for a same brand or sub-brand within adjacent pods may be of medium impact. In this manner, the frequency thresholds (caps) for higher impact over-exposure events may be lower than the frequency thresholds for lower impact over-exposure events. The remote system 120 may set the thresholds based on the perceived impact as shown in Table 1. In this manner, the frequency thresholds may be optimized to improve a user's experience.

In one or more embodiments, the device 104 and/or the remote system 120 may include and/or be facilitated by a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, or the like.

Figure 2:
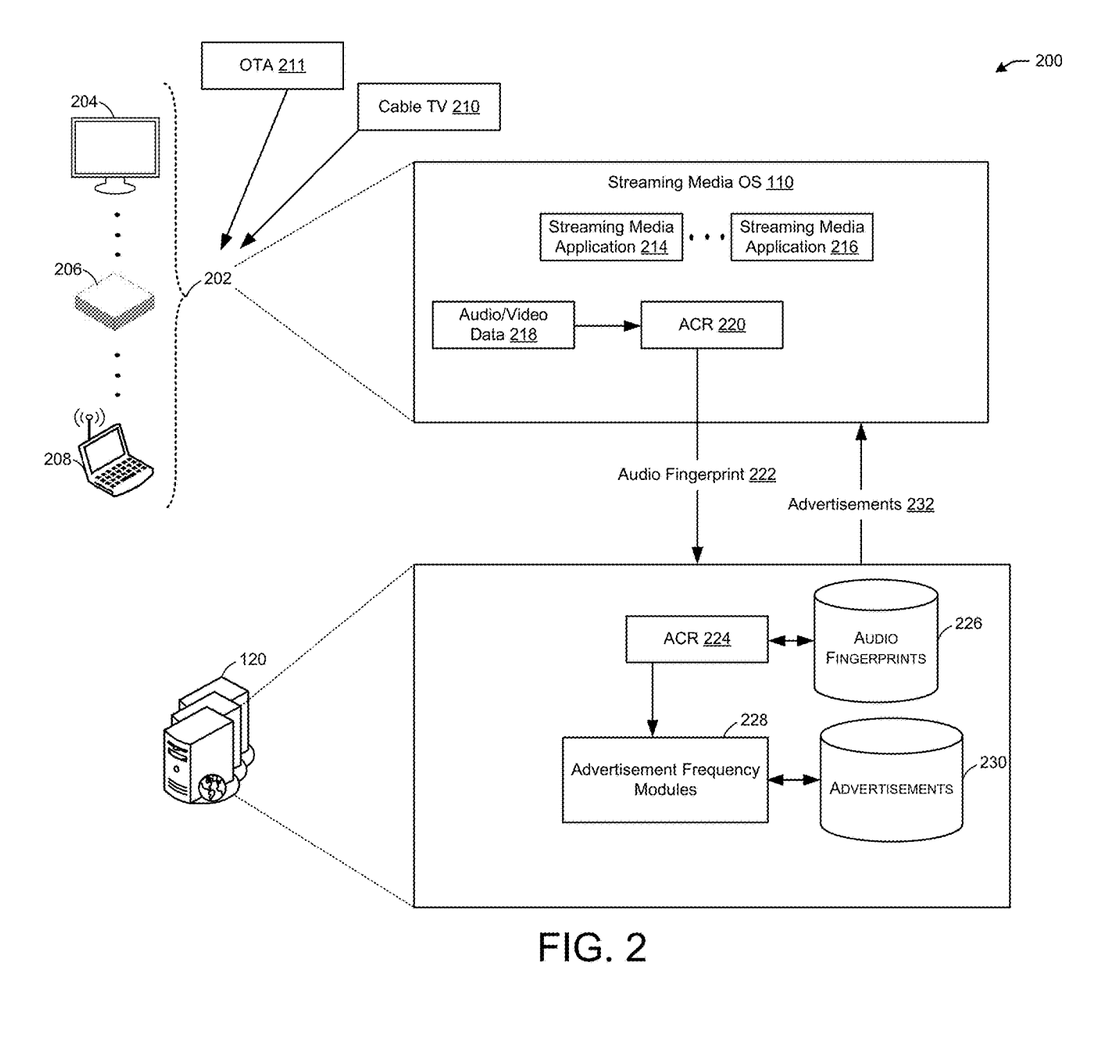
FIG. 2 shows an example system for cross-media advertisement presentation frequency limits, in accordance with one or more example embodiments of the present disclosure.

FIG. 2 shows an example system 200 for cross-media advertisement presentation frequency limits, in accordance with one or more example embodiments of the present disclosure.

Referring to FIG. 2, the system 200 may include devices 202 (e.g., device 204, device 206, device 208, which may include the device 104 of FIG. 1 and/or any device capable of presenting streaming media and video, presenting cable/satellite television 210, and or capable of presenting OTA broadcasts 211). The devices 202 may have the streaming media OS 110 with multiple streaming media applications (e.g., streaming media application 214, streaming media application 216, etc. which may include any combination of first- and third-party applications with respect to the streaming media OS 110 and the remote system 120 of FIG. 1). The streaming media OS 110 may receive audio/video data 218 and, using ACR modules 220, may generate audio fingerprints 222 based on the audio/video data 218 and ACR modules 220. In this manner, even when the streaming media OS 110 is not aware of the identity of the audio/video data 218 (e.g., because the audio/video data 218 is presented with cable/satellite television 210 and/or with OTA 211 not provided by the streaming media OS 110 and/or because the audio/video data 218 is presented with a third-party application that does not identify, to the streaming media OS 110 and remote system 120, which advertisements are being presented), ACR with the audio fingerprints 222 may be used by the remote system 120 to identify the content presented.

Still referring to FIG. 2, the remote system 120 may include ACR modules 224 to compare the audio fingerprints 222 to stored audio fingerprints 226 to identify a match. When the remote system 120 identifies a matching fingerprint, the remote system 120 may identify the source of the fingerprint (e.g., an advertisement of which the fingerprint represents at least a portion). In this manner, the source content of the stored audio fingerprints 226 may be identified for the remote system 120. The remote system 120 may use advertisement frequency modules to set the frequency limits for a same advertisement pod, consecutive advertisement pods, user sessions, and time periods, among other limits. Based on the ACR matches, the remote system 120 may determine the number of times that an advertisement has been presented to a user across multiple media channels. The remote system 120 may determine how many times an advertisement has been presented to a user in a same pod, in consecutive pods, in a same user session, and in a same day. The frequency limits may limit the presentation of a same or similar advertisement to a same user based on how many times the advertisement may be presented to the user in a same pod, in consecutive pods, in a same user session, and in a same day. When the remote system 120 determines that presenting a same or similar advertisement to a same user would violate a frequency limit (e.g., too many times within a same pod, within consecutive pods, within a same user session, or within a same day), the remote system 120 may prevent that advertisement from being presented in the respective time period that would exceed the frequency limit. When the remote system 120 determines that repeat presentation of a same or similar advertisement at a time would not violate a frequency limit, the remote system 120 may select the advertisement for repeat presentation to the user at such time.

In one or more embodiments, the advertisement frequency modules 228 may set the frequency caps (limits) to optimize the frequency of advertisement exposure to a user so that the user is not over-exposed to an advertisement. For example, because of ACR, the exposure frequency may account for exposure on cable television and streaming media, including on-demand and linear content presentations.

In one or more embodiments, the exposure frequency may be used to limit advertisement exposure on first-party applications and third-party applications. In one example, the ACR modules 224 may determine which advertisements have been presented to a user while viewing linear cable television, and the advertisement frequency modules 228 may consider the presentation of the advertisements with linear cable television when making advertisement serving decisions during presentation of streaming media content (e.g., using a streaming media application available using the streaming media OS 110). In particular, the advertisement frequency modules 228 may prevent an advertisement from being presented during presentation of streaming media content when that advertisement was recently presented (e.g., with a same day) using linear cable television and/or using a different streaming media application. In this manner, the advertisement frequency modules 228 may determine an optimal number of times to reach viewers with advertisements across multiple media channels.

In one or more embodiments, for users who opt out of ACR or for when ACR is otherwise unavailable, the advertisement frequency modules 228 may use audience modeling to estimate advertisement exposure across multiple content mediums. By estimating which content a viewer was presented, the advertisement frequency modules 228 may determine or estimate which advertisements were presented, and may account for the estimated advertisement exposure when serving advertisements. In this manner, estimated advertisement exposure using a combination of ACR and non-ACR techniques such as audience modeling may affect advertisement selection and presentation.

In one or more embodiments, ACR may capture audio from the devices 202 based on the audio playback data (e.g., in contrast with a recording of audio captured by a microphone). In particular, as the audio data is decoded for playback at the device 104, the streaming media OS 110 may generate snippets as fingerprints (e.g., fingerprints may be generated and hashed locally at the client-device level). The streaming media OS 110 may send the audio fingerprints 222 to the remote system 120 for analysis. The remote system 120 may compare the audio fingerprints to a database of audio fingerprints 226 to detect a match. Because the media title or advertisement from which the audio fingerprints 226 in the database are known to the remote system 120, the remote system 120 may determine from which media title or advertisement a fingerprint generated by the streaming media application originated. The remote system 120 may determine that an advertisement was presented to the user at a particular time, and can include that exposure to a count against a frequency cap.

In one or more embodiments, third-party applications may provide to the remote system 120 similar ACR and/or audience modeling data indicating which advertisements were presented on other applications (e.g., to which the streaming media application may not have access). The third-party data may be considered when determining advertisement exposure across multiple channels.

In one or more embodiments, the remote system 120 may use frequency caps in combination with the advertisement exposure data across multiple channels to avoid presenting the same or similar advertisement to a user within a given time period, such as in consecutive advertisements, in a same advertisement break, and/or in multiple advertisement breaks during a time period or media title. In particular, the remote system 120 may avoid selecting an advertisement that may have already been presented to a user during a particular time period or media title, either by not selecting the advertisement, removing the advertisement from an advertisement pod, and/or communicating the exposure of an advertisement to a third-party service.

In one or more embodiments, to determine whether an advertisement may be presented to a user without over-exposing the user to the advertisement, frequency thresholds may be used to limit exposure. For example, the remote system 120 may use one or more thresholds for advertisement frequency within a same advertisement pod, adjacent (e.g., consecutive) advertisement pods, a user session, and/or a time period (e.g., a day, a few hours, etc.). When an advertisement, a similar advertisement for a same product or brand, or a shorter or longer version of same advertisement has been presented to a user a threshold number of times (e.g., based on the one or more thresholds described above), the remote system 120 may refrain from serving that advertisement to the user. Similar to the different thresholds, the remote system 120 may prioritize the mitigation of advertisement over-exposure based on a perceived severity of the impact of different types of over-exposure (e.g., same advertisement within a pod, same advertisement within adjacent pods, same advertisement within a user session, same advertisement within a time period). An example of the perceived severity of advertisement over-exposure types is shown above in Table 1. As shown in Table 1, showing a same advertisement (e.g., creative), a same advertisement campaign, advertisements for a same brand, and advertisements for a same sub-brand within a current (e.g., same) advertisement pod may be considered as having high perceived impact on a user's experience. In adjacent advertisement pods, showing a same advertisement or a same advertisement campaign may be considered as having high perceived impact on a user's experience, but advertisements for a same brand or sub-brand within adjacent pods may be of medium impact. In this manner, the frequency thresholds (caps) for higher impact over-exposure events may be lower than the frequency thresholds for lower impact over-exposure events. The remote system 120 may set the thresholds based on the perceived impact as shown in Table 1. In this manner, the frequency thresholds may be optimized to improve a user's experience.

Figure 3A:
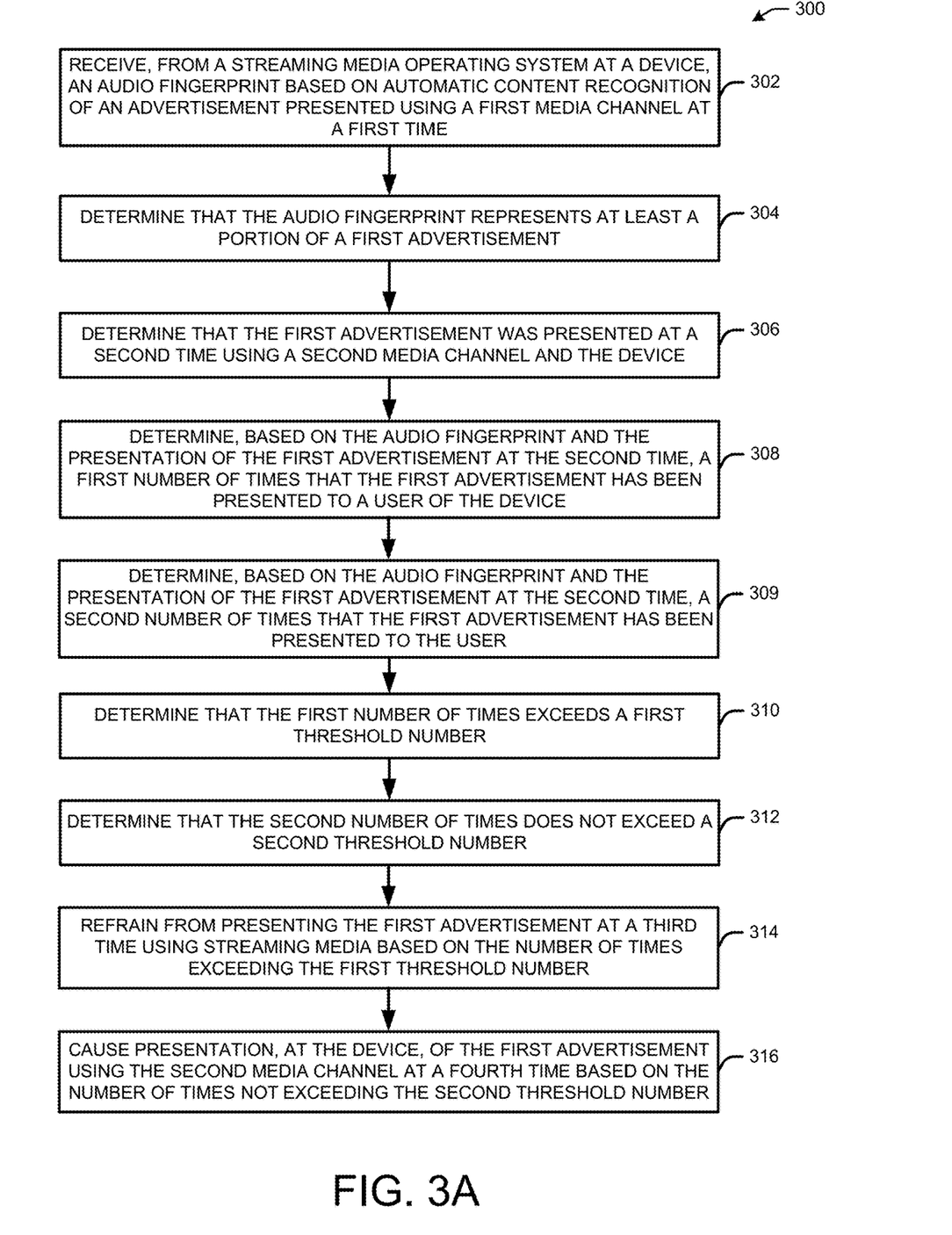
FIG. 3A illustrates a flow diagram for a process for cross-media advertisement presentation frequency limits, in accordance with one or more example embodiments of the present disclosure.

FIG. 3A illustrates a flow diagram for a process 300 for cross-media advertisement presentation frequency limits, in accordance with one or more example embodiments of the present disclosure.

At block 302, a device (or system, e.g., the remote system 120 of FIG. 1) may receive, from a streaming media operating system (e.g., the streaming media OS 110 of FIG. 1) at a second device (e.g., the device 104 of FIG. 1), an audio fingerprint (e.g., the audio fingerprint 116 of FIG. 1) generated based on ACR of an advertisement (e.g., the video advertisement 106 of FIG. 1) presenting using a first media channel at a first time.

At block 304, the device may determine that the audio fingerprint represents at least a portion of a first advertisement. The device may have stored audio fingerprints (e.g., the audio fingerprints 222 of FIG. 2) whose source content is identified. In this manner, when the device identifies, from the stored audio fingerprints, a match to an audio fingerprint received from the second device, the device may determine from which advertisement the received audio fingerprint was generated. The received fingerprint may be generated when the media channel with which the first advertisement was presented is not a first-party media channel with respect to the device. For example, the device may be associated with one or more first-party streaming media applications available using the streaming media operating system, but the second device may present content from third-party applications and cable/satellite television. The device may not have access to a list of advertisements presented by third-party applications and/or cable/satellite television, but may be involved in the selection of advertisements for first-party applications. In this manner, the device may be aware of advertisements presented using first-party applications, when, and to which users, but may rely on ACR to determine when advertisements are presented using other media channels.

At block 306, the device may determine that the first advertisement was presented at a second time using a second media channel and the second device. The second media channel may be a first-party streaming media application to which the device has access to data indicating which advertisements were presented to a user, or may be a third-party streaming application or cable/satellite television for which the device may rely on ACR to identify the presentation of the first advertisement.

At block 308, the device may determine, based on the audio fingerprint and the presentation of the first advertisement at the second time, a first number of times that the first advertisement has been presented to a user of the second device. At block 309, the device may determine, based on the audio fingerprint and the presentation of the first advertisement at the second time, a first number of times that the first advertisement has been presented to a user of the second device. As noted above, using a combination of ACR-identified advertisement presentations and first-party advertisement presentations, the device may determine the number of times that an advertisement has been presented to a user in a given time period across multiple media channels. The first number of times may correspond to a first time period, and the second number of times may correspond to a second time period (e.g., how many times the advertisement was presented in a same pod, in consecutive pods, in a same user session, during a same day, etc.).

At block 310, the device may determine that the first number of times exceeds a first threshold number. At block 312, the device may determine that the second number of times does not exceed a second threshold number. The thresholds may represent frequency limits corresponding to the different time periods (how many times the advertisement may be presented in a same pod, in consecutive pods, in a same user session, during a same day, etc.). The device may set the thresholds based on a perceived effect that the repetitions may have on a user's experience, as shown in Table 1 above.

At block 314, the device may refrain from presenting the first advertisement at a third time using streaming media (e.g., a first-party application) based on the number of times exceeding the first threshold. For example, when presenting the first advertisement multiple times in a same pod would exceed a frequency threshold for same-pod repetition, the device may refrain from selecting the first advertisement multiple times in the same pod. When presenting the first advertisement multiple times in consecutive pods would exceed a frequency threshold for same-pod repetition, the device may refrain from selecting the first advertisement multiple times in consecutive pods. When presenting the first advertisement multiple times in consecutive pods would exceed a frequency threshold for same-session repetition, the device may refrain from selecting the first advertisement multiple times in a user session. When presenting the first advertisement multiple times in consecutive pods would exceed a frequency threshold for same-day repetition, the device may refrain from selecting the first advertisement multiple times in a day. At block 316, the device may select and cause presentation (e.g., send the selection and/or selected advertisement for presentation) of the first advertisement at the second device at a fourth time when presentation of the first advertisement would not exceed the second threshold. For example, presentation of the first advertisement at the third time may exceed a frequency cap, but presentation of the first advertisement at a fourth time may not exceed a frequency cap (e.g., may avoid a same-pod or consecutive pod presentation, but may allow for a same session or same day presentation).

Figure 3B:
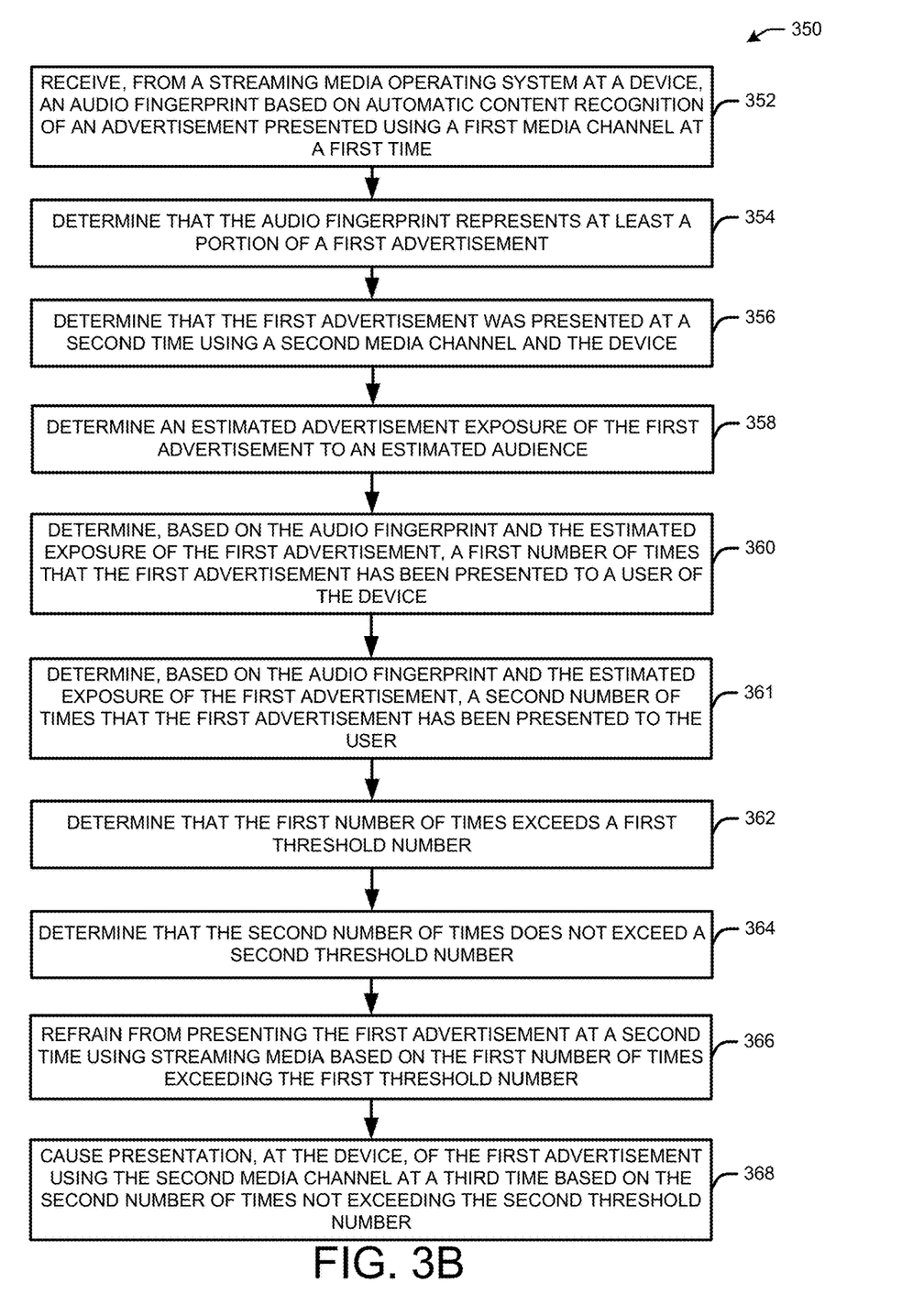
FIG. 3B illustrates a flow diagram for a process for cross-media advertisement presentation frequency limits, in accordance with one or more example embodiments of the present disclosure.

FIG. 3B illustrates a flow diagram for a process 350 for cross-media advertisement presentation frequency limits, in accordance with one or more example embodiments of the present disclosure.

At block 352, a device (or system, e.g., the remote system 120 of FIG. 1) may receive, from a streaming media operating system (e.g., the streaming media OS 110 of FIG. 1) at a second device (e.g., the device 104 of FIG. 1), an audio fingerprint (e.g., the audio fingerprint 116 of FIG. 1) generated based on ACR of an advertisement (e.g., the video advertisement 106 of FIG. 1) presenting using a first media channel at a first time.

At block 354, the device may determine that the audio fingerprint represents at least a portion of a first advertisement. The device may have stored audio fingerprints (e.g., the audio fingerprints 222 of FIG. 2) whose source content is identified. In this manner, when the device identifies, from the stored audio fingerprints, a match to an audio fingerprint received from the second device, the device may determine from which advertisement the received audio fingerprint was generated. The received fingerprint may be generated when the media channel with which the first advertisement was presented is not a first-party media channel with respect to the device. For example, the device may be associated with one or more first-party streaming media applications available using the streaming media operating system, but the second device may present content from third-party applications and cable/satellite television. The device may not have access to a list of advertisements presented by third-party applications and/or cable/satellite television, but may be involved in the selection of advertisements for first-party applications. In this manner, the device may be aware of advertisements presented using first-party applications, when, and to which users, but may rely on ACR to determine when advertisements are presented using other media channels.

At block 356, the device may determine that the first advertisement was presented at a second time using a second media channel and the second device. The second media channel may be a first-party streaming media application to which the device has access to data indicating which advertisements were presented to a user, or may be a third-party streaming application or cable/satellite television for which the device may rely on ACR to identify the presentation of the first advertisement.

At block 358, the device may determine an estimated advertisement exposure of the first advertisement to an estimated audience. For users who opt out of ACR or for when ACR is otherwise unavailable, the device may use audience modeling to estimate advertisement exposure across multiple content mediums. By estimating which content a viewer was presented, the advertisement service may determine or estimate which advertisements were presented, and may account for the estimated advertisement exposure when serving advertisements. In this manner, estimated advertisement exposure using a combination of ACR and non-ACR techniques such as audience modeling may affect advertisement selection and presentation.

At block 360, the device may determine, based on the received audio fingerprint and the estimated exposure of the first advertisement, a first number of times that the advertisement has been presented to a user of the device. At block 361, the device may determine, based on the received audio fingerprint and the estimated exposure of the first advertisement, a second number of times that the advertisement has been presented to a user of the device. As noted above, using a combination of estimated advertisement presentations and first-party advertisement presentations, the device may determine the number of times that an advertisement has been presented to a user in a given time period across multiple media channels. The first number of times may correspond to a first time period, and the second number of times may correspond to a second time period (e.g., how many times the advertisement was presented in a pod, in consecutive pods, in a same user session, during a same day, etc.).

At block 362, the device may determine that the first number of times exceeds a first threshold number. At block 364, the device may determine that the second number of times does not exceed a second threshold number. The thresholds may represent frequency limits corresponding to the different time periods (how many times the advertisement may be presented in a same pod, in consecutive pods, in a same user session, during a same day, etc.). The device may set the thresholds based on a perceived effect that the repetitions may have on a user's experience, as shown in Table 1 above.

At block 366, the device may refrain from presenting the first advertisement at a third time using streaming media (e.g., a first-party application) based on the number of times exceeding the first threshold. For example, when presenting the first advertisement multiple times in a same pod would exceed a frequency threshold for same-pod repetition, the device may refrain from selecting the first advertisement multiple times in the same pod. When presenting the first advertisement multiple times in consecutive pods would exceed a frequency threshold for same-pod repetition, the device may refrain from selecting the first advertisement multiple times in consecutive pods. When presenting the first advertisement multiple times in consecutive pods would exceed a frequency threshold for same-session repetition, the device may refrain from selecting the first advertisement multiple times in a user session. When presenting the first advertisement multiple times in consecutive pods would exceed a frequency threshold for same-day repetition, the device may refrain from selecting the first advertisement multiple times in a day. At block 368, the device may select and cause presentation (e.g., send the selection and/or selected advertisement for presentation) of the first advertisement at the second device at a fourth time when presentation of the first advertisement would not exceed the second threshold. For example, presentation of the first advertisement at the third time may exceed a frequency cap, but presentation of the first advertisement at a fourth time may not exceed a frequency cap (e.g., may avoid a same-pod or consecutive pod presentation, but may allow for a same session or same day presentation).

Figure 4:
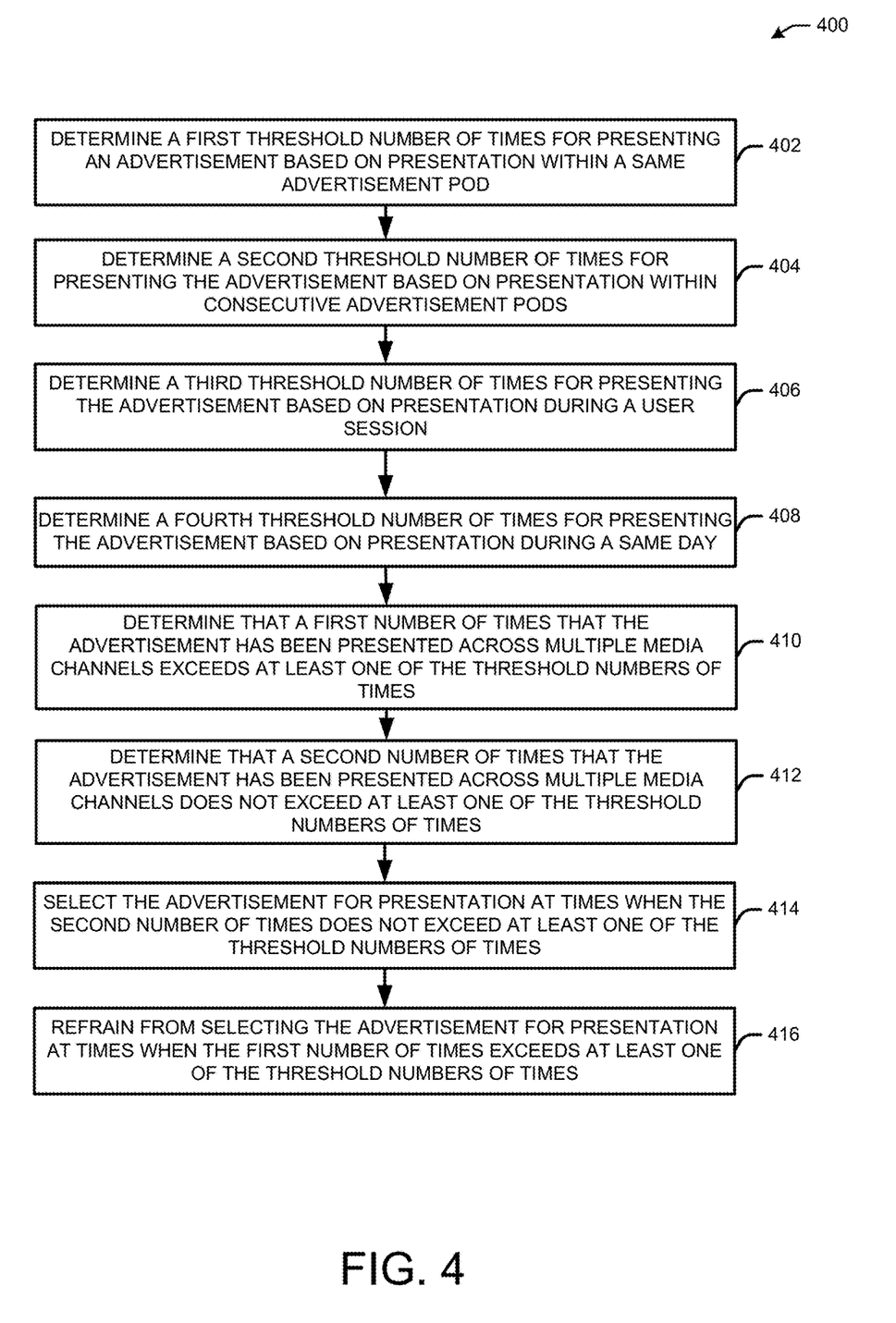
FIG. 4 illustrates a flow diagram for a process for cross-media advertisement presentation frequency limits, in accordance with one or more example embodiments of the present disclosure.

FIG. 4 illustrates a flow diagram for a process 400 for cross-media advertisement presentation frequency limits, in accordance with one or more example embodiments of the present disclosure.

At block 402, a device (or system, e.g., the remote system 120 of FIG. 1) may determine a first threshold number of times (e.g., a first frequency limit) for presenting an advertisement based on presentation of the advertisement within a same advertisement pod. At block 404, the device may determine a second threshold number of times for presenting the advertisement based on presentation of the advertisement within consecutive advertisement pods. At block 406, the device may determine a third threshold number of times for presenting the advertisement based on presentation of the advertisement during a user session. At block 408, the device may determine a fourth threshold number of times for presenting the advertisement based on presentation of the advertisement during a same day. In this manner, the numbers of times (e.g., frequency thresholds) may limit the number of times that a same or similar advertisement may be presented during different time periods corresponding to a same pod, consecutive pods, different pods in a same session, and different pods during a same day. The thresholds may be the same and/or may differ from one another. For example, the first threshold may be zero, preventing any same-pod presentation of a same or similar advertisement. The second threshold also may be zero, or may allow for some consecutive pod repetition of a same or similar advertisement. The third threshold may be larger, allowing for more repeat presentation of an advertisement in a same user session as long as the advertisement is not presented often in a same pod or in consecutive pods during the user session. The fourth threshold may be larger, allowing for more repeat presentation of an advertisement in a same day as long as the advertisement is not presented often in a same pod, in consecutive pods, or during a same user session.

At block 410, the device may determine, based on received audio fingerprints, estimated exposure from estimated audiences, and/or first-party application presentation of the advertisement, a first number of times that the advertisement has been presented to a user of the device. At block 412, the device may determine, based on received audio fingerprints, estimated exposure from estimated audiences, and/or first-party application presentation of the advertisement, a second number of times that the advertisement has been presented to a user of the device. As noted above, using a combination of estimated advertisement presentations, ACR fingerprints, and first-party advertisement presentations, the device may determine the number of times that an advertisement has been presented to a user in a given time period across multiple media channels. The first number of times may correspond to a first time period, and the second number of times may correspond to a second time period (e.g., how many times the advertisement was presented in a same pod, in consecutive pods, in a same user session, during a same day, etc.).

At block 414, the device may select and cause presentation (e.g., using first-party applications) of the first advertisement times when presentation of the first advertisement would not exceed the thresholds (e.g., the second number of times is below at least one of the thresholds). At block 416, the device may refrain from selecting the first advertisement for presentation using streaming media (e.g., a first-party application) at times based on the first the number of times exceeding the first threshold. For example, when presenting the first advertisement multiple times in a same pod would exceed a frequency threshold for same-pod repetition, the device may refrain from selecting the first advertisement multiple times in the same pod. When presenting the first advertisement multiple times in consecutive pods would exceed a frequency threshold for same-pod repetition, the device may refrain from selecting the first advertisement multiple times in consecutive pods. When presenting the first advertisement multiple times in consecutive pods would exceed a frequency threshold for same-session repetition, the device may refrain from selecting the first advertisement multiple times in a user session. When presenting the first advertisement multiple times in consecutive pods would exceed a frequency threshold for same-day repetition, the device may refrain from selecting the first advertisement multiple times in a day.

The descriptions herein are not meant to be limiting.

Figure 5:
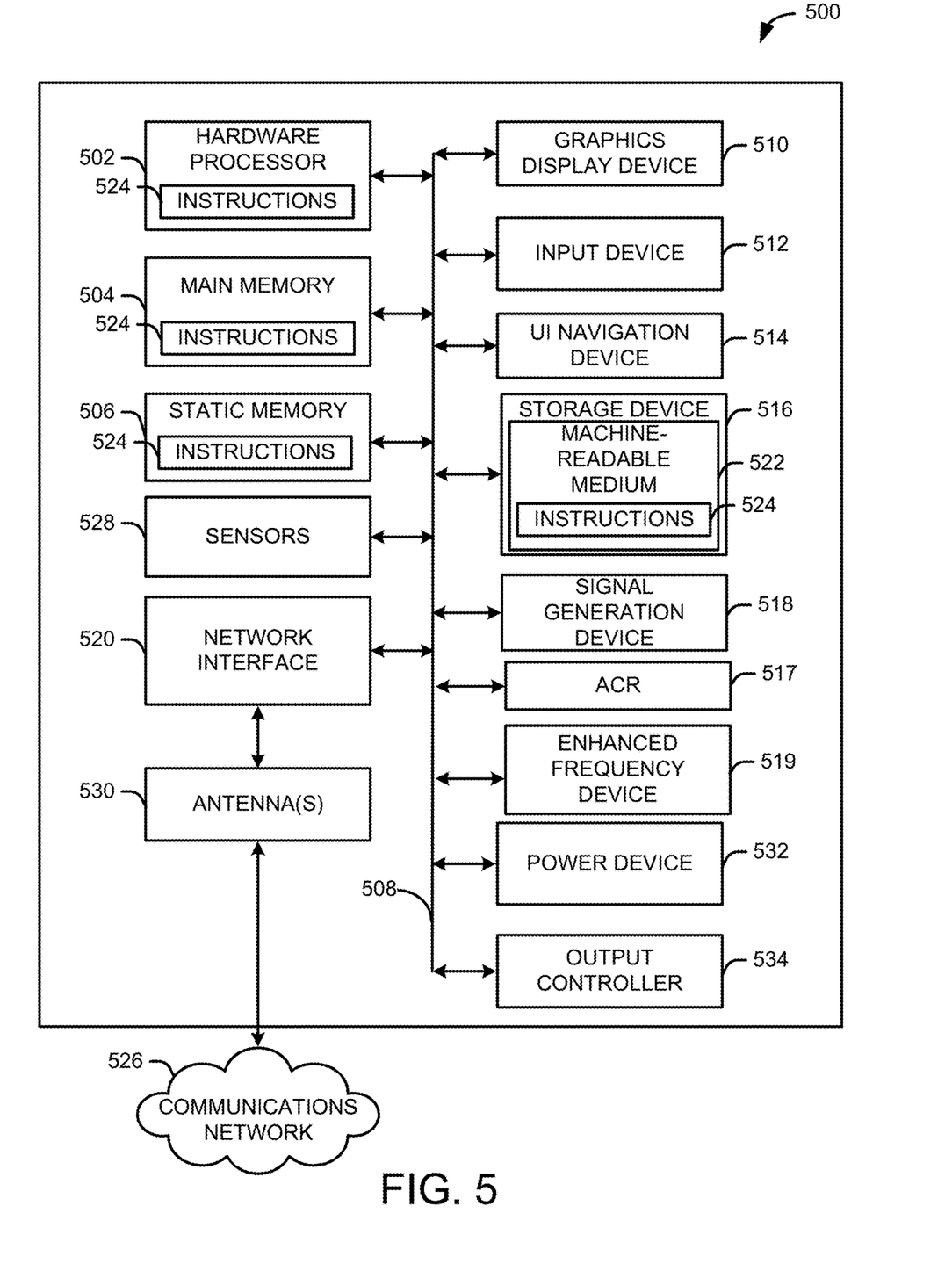
FIG. 5 illustrates a block diagram of an example machine upon which any of one or more techniques (e.g., methods) may be performed, in accordance with one or more example embodiments of the present disclosure.

FIG. 5 illustrates a block diagram of an example of a machine 500 (e.g., the system 200 of FIG. 2) or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act in Wi-Fi direct, peer-to-peer (P2P), cellular, (or other distributed) network environments. The machine 500 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532 (e.g., a battery or other power source), a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518, enhanced frequency device 519 (e.g., capable of performing any of the functions described in FIGS. 1-4), a network interface device/transceiver 520 coupled to antenna(s) 530, and one or more sensors 528, such as a microphone, a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for managing advertisement exposure, the method comprising:
   receiving, by at least one processor of a first device, from a streaming media operating system of a second device, an audio fingerprint based on presentation of cable television at a first time;
   determining, by the at least one processor, using automatic content recognition, that the audio fingerprint represents at least a portion of a first advertisement;
   determining, by the at least one processor, that the first device previously selected the first advertisement for presentation using a streaming media application of the streaming media operating system at a second time;
   determining, by the at least one processor, based on the audio fingerprint and the previous selection of the first advertisement, a first number of times that the first advertisement has been presented to a user of the second device, the first number of times associated with a third time;
   determining, by the at least one processor, that the first number of times that the first advertisement has been presented to the user exceeds a first threshold number associated with the third time;
   refraining, by the at least one processor, based on the first number of times exceeding the first threshold number, from selecting the first advertisement for subsequent presentation using the streaming media application at the third time;
   determining, by the at least one processor, based on the audio fingerprint and the previous selection of the first advertisement, a second number of times that the first advertisement has been presented to a user of the second device, the second number of times associated with a fourth time;
   determining, by the at least one processor, that the second number of times that the first advertisement has been presented to the user is below a second threshold number associated with the fourth time;
   selecting, by the at least one processor, based on the second number of times being below the second threshold number, the first advertisement for subsequent presentation using the streaming media application at the fourth time; and
   causing presentation, by the at least one processor, at the second device, of the first advertisement using the streaming media application at the fourth time.

2. The method of claim 1, further comprising:
   determining that the second time is associated with a first advertisement pod; and
   determining that the third time is associated with the first advertisement pod,
   wherein the first threshold number and the first number of times are further associated with repeated presentation of advertisements within the first advertisement pod.

3. The method of claim 1, further comprising:
   determining that the second time is associated with a first advertisement pod; and
   determining that the third time is associated with a second advertisement pod consecutive with the first advertisement pod,
   wherein the first threshold number and the first number of times are associated with repeated presentation of advertisements within consecutive advertisement pods.

4. The method of claim 1, further comprising:
   determining that the second time is associated with presentation of a streaming media title using the streaming media application; and
   determining that the third time is associated with presentation of the streaming media title,
   wherein the first threshold number and the first number of times are associated with repeated presentation of advertisements during the streaming media title.

5. The method of claim 1, further comprising:
   determining a first time difference between the second time and the third time;
   determining a second time difference between the second time and the fourth time;
   determining that the first time difference is below a time threshold; and
   determining that the second time difference exceeds the time threshold,
   wherein determining that the first number of times that the first advertisement has been presented to the user exceeds the first threshold number is based on the first time difference being below the time threshold, and
   wherein determining that the second number of times that the first advertisement has been presented to the user is below the second threshold number is based on the second time difference exceeding the time threshold.

6. A method for managing advertisement exposure, the method comprising:
   receiving, by at least one processor of a first device, from a streaming media operating system of a second device, an audio fingerprint based on presentation of first media content using a first media channel at a first time;
   determining, by the at least one processor, using automatic content recognition, that the audio fingerprint represents at least a portion of a first advertisement;
   determining, by the at least one processor, that the first advertisement was presented at a second time using a second media channel and the second device;
   determining, by the at least one processor, based on the audio fingerprint and the presentation of the first advertisement at the second time, a first number of times that the first advertisement has been presented to a user of the second device, the first number of times associated with a third time;
   determining, by the at least one processor, that the first number of times that the first advertisement has been presented to the user exceeds a first threshold number associated with the third time;
   refraining, by the at least one processor, based on the first number of times exceeding the first threshold number, from selecting the first advertisement for subsequent presentation using the second media channel at the third time;
   determining, by the at least one processor, based on the audio fingerprint and the presentation of the first advertisement at the second time, a second number of times that the first advertisement has been presented to a user of the second device, the second number of times associated with a fourth time;
   determining, by the at least one processor, that the second number of times that the first advertisement has been presented to the user is below a second threshold number associated with the fourth time;
   selecting, by the at least one processor, based on the second number of times being below the second threshold number, the first advertisement for subsequent presentation using the second media channel at the fourth time; and causing presentation, by the at least one processor, at the second device, of the first advertisement using the second media channel at the fourth time.

7. The method of claim 6, wherein the first media channel is cable television, and wherein the second media channel is a streaming media application.

8. The method of claim 6, wherein the first media channel is a third-party streaming media application relative to the streaming media operating system, and wherein the second media channel is a first-party streaming media application relative to the streaming media operating system.

9. The method of claim 6, further comprising:
determining that the second time is associated with a first advertisement pod; and
determining that the third time is associated with the first advertisement pod,
wherein the first threshold number and the first number of times are associated with repeated presentation of advertisements within the first advertisement pod.

10. The method of claim 6, further comprising:
determining that the second time is associated with a first advertisement pod; and
determining that the third time is associated with a second advertisement pod consecutive with the first advertisement pod,
wherein the first threshold number and the first number of times are associated with repeated presentation of advertisements within consecutive advertisement pods.

11. The method of claim 6, further comprising:
determining that the second time is associated with presentation of a streaming media title using the second media channel; and
determining that the third time is associated with presentation of the streaming media title using the second media channel,
wherein the first threshold number and the first number of times are associated with repeated presentation of advertisements during presentation of the streaming media title using the second media channel.

12. The method of claim 6, further comprising:
determining a first time difference between the second time and the third time;
determining a second time difference between the second time and the fourth time;
determining that the first time difference is below a time threshold; and
determining that the second time difference exceeds the time threshold,
wherein determining that the first number of times that the first advertisement has been presented to the user exceeds the first threshold number is based on the first time difference being below the time threshold, and
wherein determining that the second number of times that the first advertisement has been presented to the user is below the second threshold number is based on the second time difference exceeding the time threshold.

13. The method of claim 6, further comprising:
determining, by the at least one processor, that a second advertisement was presented at a fifth time using the second device, the second advertisement comprising at least a portion of the first advertisement,
wherein determining the first number of times that the first advertisement has been presented to the user of the second device is further based on presentation of the second advertisement at the fifth time.

14. The method of claim 6, further comprising:
determining, by the at least one processor, that a second advertisement was presented at a fifth time using the second device, the first advertisement and the second advertisement associated with a same product, product brand, or product sub-brand,
wherein determining the first number of times that the first advertisement has been presented to the user of the second device is further based on presentation of the second advertisement at the fifth time.

15. The method of claim 6, further comprising:
identifying an estimated audience of second media content based on respective probabilities that respective users of the estimated audience are within a respective age ranges; and
determining an estimated advertisement exposure of the first advertisement to the estimated audience,
wherein determining the first number of times that the first advertisement has been presented to the user of the second device is further based on the estimated advertisement exposure of the first advertisement to the estimated audience.

16. A system for managing advertisement exposure, the system comprising:
a streaming media operating system; and
at least one processor of a first device associated with the streaming media operating system, the at least one processor coupled to memory and configured to:
receive, from the streaming media operating system, an audio fingerprint based on presentation of first media content using a first media channel at a second device at a first time;
determine, using automatic content recognition, that the audio fingerprint represents at least a portion of a first advertisement;
determine that the first advertisement was presented at a second time using a second media channel and the second device;
determine, based on the audio fingerprint and the presentation of the first advertisement at the second time, a first number of times that the first advertisement has been presented to a user of the second device, the first number of times associated with a third time;
determine that the first number of times that the first advertisement has been presented to the user exceeds a first threshold number associated with the third time;
refrain, based on the first number of times exceeding the first threshold number, from selecting the first advertisement for subsequent presentation using the second media channel at a third time;
determine, based on the audio fingerprint and the presentation of the first advertisement at the second time, a second number of times that the first advertisement has been presented to a user of the second device, the second number of times associated with a fourth time;
determine that the second number of times that the first advertisement has been presented to the user is below a second threshold number associated with the fourth time;
select, based on the second number of times being below the second threshold number, the first advertisement for subsequent presentation using the second media channel at the fourth time; and cause presentation, at the second device, of the first advertisement using the second media channel at the fourth time.

17. The system of claim 16, wherein the first media channel is cable television, and wherein the second media channel is a streaming media application.

18. The system of claim 16, wherein the first media channel is a third-party streaming media application relative to the streaming media operating system, and wherein the second media channel is a first-party streaming media application relative to the streaming media operating system.

19. The system of claim 16, wherein the at least one processor is further configured to:
  determine that the second time is associated with a first advertisement pod; and
  determine that the third time is associated with the first advertisement pod,
  wherein the first threshold number and the first number of times are associated with repeated presentation of advertisements within the first advertisement pod.

20. The system of claim 16, wherein the at least one processor is further configured to:
  determine that the second time is associated with a first advertisement pod; and
  determine that the third time is associated with a second advertisement pod consecutive with the first advertisement pod,
  wherein the first threshold number and the first number of times are associated with repeated presentation of advertisements within consecutive advertisement pods.

* * * * *